(12) United States Patent
Claas et al.

(10) Patent No.: US 7,866,420 B1
(45) Date of Patent: Jan. 11, 2011

(54) TRACK TENSIONING SYSTEM FOR A TRACKED VEHICLE

(75) Inventors: Robert Claas, Saukville, WI (US); Mark McDowell, Fond du Lac, WI (US)

(73) Assignee: Gehl Company, West Bend, WI (US)

( * ) Notice: Subject to any disclaimer, the term of this patent is extended or adjusted under 35 U.S.C. 154(b) by 39 days.

(21) Appl. No.: 12/468,609

(22) Filed: May 19, 2009

(51) Int. Cl.
*B62D 55/14* (2006.01)
(52) U.S. Cl. ........................... 180/9.1; 305/145
(58) Field of Classification Search ......... 180/182–196, 180/9–9.64; 305/145
See application file for complete search history.

(56) References Cited

U.S. PATENT DOCUMENTS

| | | | |
|---|---|---|---|
| 2,926,969 A | 3/1960 | Ashley, Jr. | |
| 4,406,501 A | 9/1983 | Christensen | |
| 4,840,437 A | 6/1989 | Henry et al. | |
| 5,984,436 A | 11/1999 | Hall | |
| 6,027,185 A | 2/2000 | Crabb | |
| 6,224,172 B1 | 5/2001 | Goodwin | |
| 6,869,153 B2 | 3/2005 | Wright et al. | |
| 6,929,334 B2 | 8/2005 | Verheye et al. | |
| 7,226,137 B2 | 6/2007 | Fornes | |
| 7,229,140 B2 | 6/2007 | Page et al. | |
| 7,252,349 B2 | 8/2007 | Livesay et al. | |
| 7,296,862 B2 | 11/2007 | Albright et al. | |
| 2003/0117017 A1 | 6/2003 | Hoff | |
| 2005/0231035 A1 | 10/2005 | Vertoni | |

*Primary Examiner*—Tony H. Winner
(74) *Attorney, Agent, or Firm*—Boyle Fredrickson, S.C.

(57) ABSTRACT

A tensioning system for an endless track of a crawler-type vehicle includes an actuator, such as a dual-acting hydraulic cylinder and piston, which is coupled to a roller to translate the roller into and out of engagement with the endless track to tension or slack the endless track, respectively. The tensioning system has a mechanical stop that limits retraction of the actuator, and thus limits how much slack can be created in the endless track. The actuator automatically adds tension to the endless track when an undertensioned condition is present and automatically removes tension from the endless track when an overtensioned condition is present. To add additional slack to the endless track for removing the endless track for service, repair, or replacement, the mechanical stop may be removed which allows additional retraction of the actuator and thus disengagement of the roller from the endless track.

20 Claims, 4 Drawing Sheets

TRACK TENSIONING SYSTEM FOR A TRACKED VEHICLE

BACKGROUND OF THE INVENTION

The present invention relates generally to an endless track tensioning system. More particularly, the invention is directed to a track tensioning system that automatically relieves tension in an endless track when the endless track encounters an obstruction and does so in a manner that limits how much slack may be introduced into the endless track but allows for the introduction of additional slack to remove the endless track for servicing and/or replacement.

A crawler-type work vehicle is typically supported and propelled by an undercarriage assembly having an endless track entrained about a drive roller or sprocket, a front idler roller, a rear idler roller, and a series of track rollers. The drive roller or sprocket is driven by an engine of the work vehicle which in turn causes the endless track to be advanced around each of the front and rear idler rollers as well as the track rollers to move the work vehicle in either a forward or reverse direction.

For the endless track to function properly, it must be tensioned taut around the several rollers. If the endless track is not properly tensioned, the track may derail from the drive sprocket or roller and the idler rollers. To this end, a tensioning mechanism is used in order to create the tension necessary to keep the track from derailing from the drive sprocket or roller and the idler rollers. In one form, the tensioning mechanism may be a coiled spring that urges the front idler roller in a direction away from the rear roller, thereby creating tension on the track. Over a period of time, a number of the components associated with the undercarriage assembly, such as the track and the idler rollers, begin to wear thereby creating slack in the track. In order to remove the slack from the track chain, it is necessary to increase the tension of the track chain to prevent undesired derailing of the track.

While it is generally desired to maintain tension in the track, there are times during operation of the work vehicle in which it is desired to introduce, albeit temporarily, slack into the endless track. For example, if the track of the work vehicle encounters a hard object such as a rock or stone with significant force, it is necessary to momentarily relieve the tension to ensure that the track is not damaged. Thus, a number of tensioning mechanisms are designed to momentarily relieve the tension in the track during such conditions. This is commonly accomplished by using a coiled spring that may compress somewhat to allow the idler roller to move away from the track and, as a result, relieve tension in the track until the obstacle is cleared. Once the obstacle is cleared, the track is automatically re-tensioned by the spring.

Typically, the spring is used in combination with a grease-type cylinder that moves the idler roller outwardly to tension the track and inwardly to introduce slack in the track in order to allow the track to be removed for servicing or replacement. The grease-type cylinder is isolated from the hydraulic system of the vehicle and is manually operated, in that an operator must stand at the vehicle and introduce grease to the appropriate side of the cylinder to extend or retract the cylinder, and must open a fitting on the opposite side of the cylinder to allow the grease to be expelled. This process is messy, wasteful and time consuming, and makes the task of changing tracks very difficult and challenging.

Therefore, there is a need for a track tensioning mechanism that eliminates the use of a grease cylinder and can be used in connection with the hydraulic system of the vehicle while isolating the hydraulic system from shocks experienced with the track encounters an obstacle, and which can temporarily relieve tension in the endless track when necessary without introducing undesirable excessive slack in the endless track during such conditions that could cause the track to derail.

SUMMARY OF THE INVENTION

The present invention provides a track tensioning system that tensions an endless track of a crawler-type vehicle during normal operation but can introduce slack in the endless track to prevent excessive tension in the track. The track tensioning system includes a dual-acting hydraulic cylinder in combination with a mechanical stop that limits how much slack may be introduced into the track. The dual-acting hydraulic cylinder is preferably interconnected in the hydraulic system of the vehicle, and includes a piston connected to an idler roller. The piston is operative to push the idler roller into the endless track to tension the endless track, and is operative to pull the idler roller away from the endless track to introduce slack to the endless track. The mechanical stop is positioned to limit how far the piston can be retracted when the track encounters an obstacle. In this manner, the piston is allowed to retract a certain distance to relieve tension in the track when the track strikes an obstacle, while preventing excessive slack that would cause the track to derail. The mechanical stop is removable, to allow further retraction of the piston. In this manner, the mechanical stop is removed in order to introduce sufficient slack in the endless track for removal of the endless track for repairing, servicing, or replacing.

It is therefore an object of the invention to provide a track tensioning system capable of introducing a limited amount of slack into an endless track during an overtensioned condition in the endless track but does so in a manner that prevents inadvertent derailing of the track. It is a further object of the invention to provide a track tensioning system that can be used with the hydraulic system of the vehicle for ease of operation, while isolating the hydraulic system from the effects of shocks experienced by the track.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

Preferred exemplary embodiments of the invention are illustrated in the accompanying drawings in which like reference numerals represent like parts throughout.

In the drawings.

DETAILED DESCRIPTION OF THE INVENTION

Figure 1:
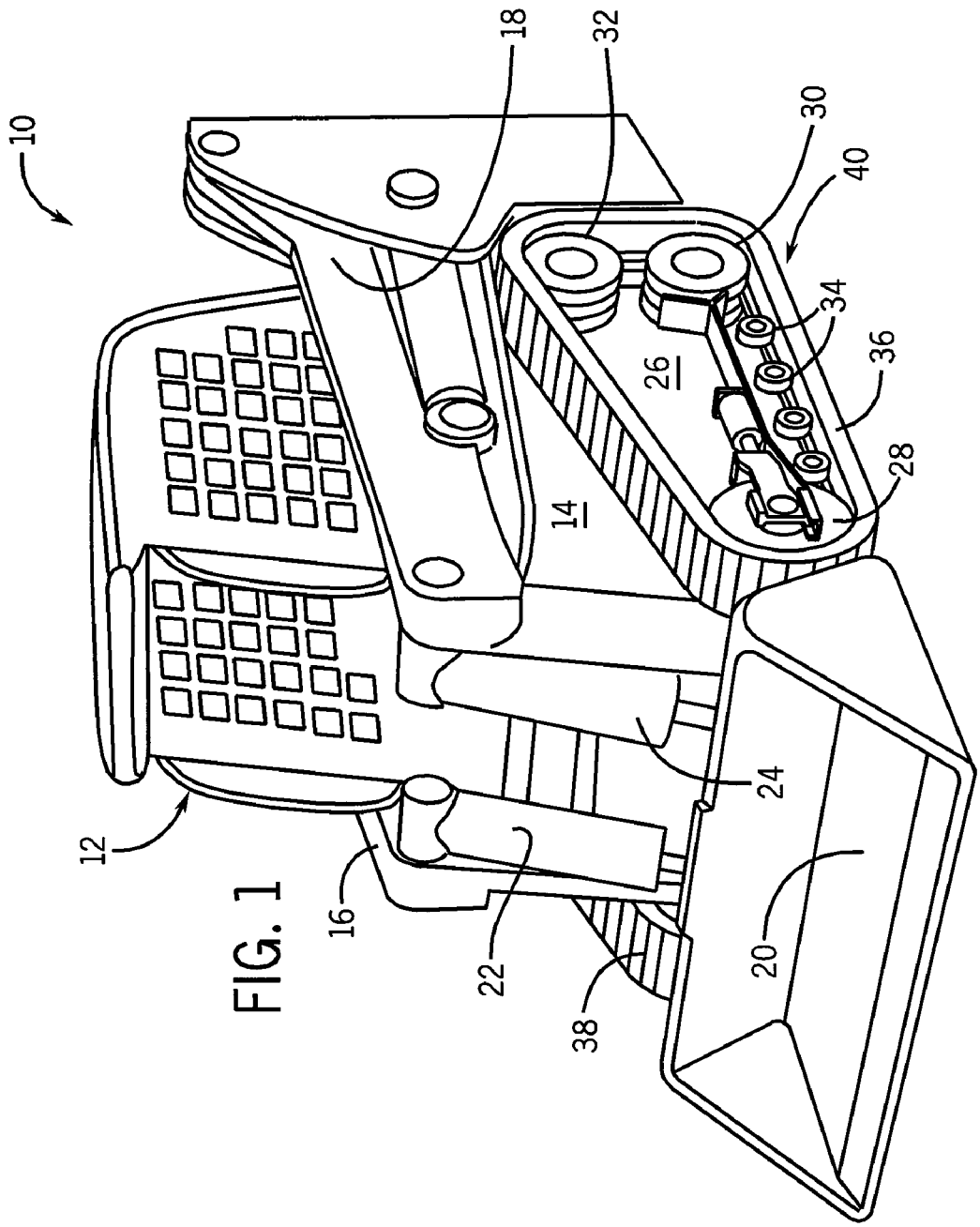
FIG. 1 is a pictorial view of a compact track-type vehicle having a track tensioning device according to the present invention.

Referring now to the drawings, and more particularly to FIG. 1, a track-type vehicle 10, e.g., a compact track loader, has an operator cab 12 supported by a chassis 14. A pair of arms 16, 18 are connected to the chassis 14 and are designed to lift and lower bucket 20 as known in the art. In addition, a pair of hydraulic actuators 22, 24 are mounted to the chassis 14 and are operative to tilt the bucket 20 when desired as also known in the art. It is understood that the specific construction of the vehicle 10 is not relevant to the present invention, and that the present invention may be used with any type of vehicle that is propelled using a track driven by a roller system.

An undercarriage 26 is secured to the chassis 14 in a known manner and includes a front idler roller 28, a rear idler roller 30, a drive roller 32, and track rollers 34 as is generally known in the art. An endless track 36 is entrained around the idler rollers 28, 30, drive roller 32, and track rollers 34. One skilled in the art will appreciate that the undercarriage 26 supports another set of rollers on the opposite side of the vehicle 10 and that another endless track 38 is entrained thereabout. In this regard, the crawler-type vehicle 10 is driven by a pair of endless tracks 36, 38 to advance the vehicle 10.

As known in the art, the drive roller 32 is connected to the engine (not shown) of the vehicle 10 and engages the endless track 36 to cause translation of the endless track 36 when the drive roller 32 is rotated by the engine. The drive roller 32 may have teeth that engage within recesses in the track 36, or the track may have teeth that are engaged within recesses in the drive roller 32. In either configuration, the drive roller 32 can be rotated in either a clockwise or a counterclockwise direction to move the vehicle 10 in either a forward or reverse direction.

Figure 2:
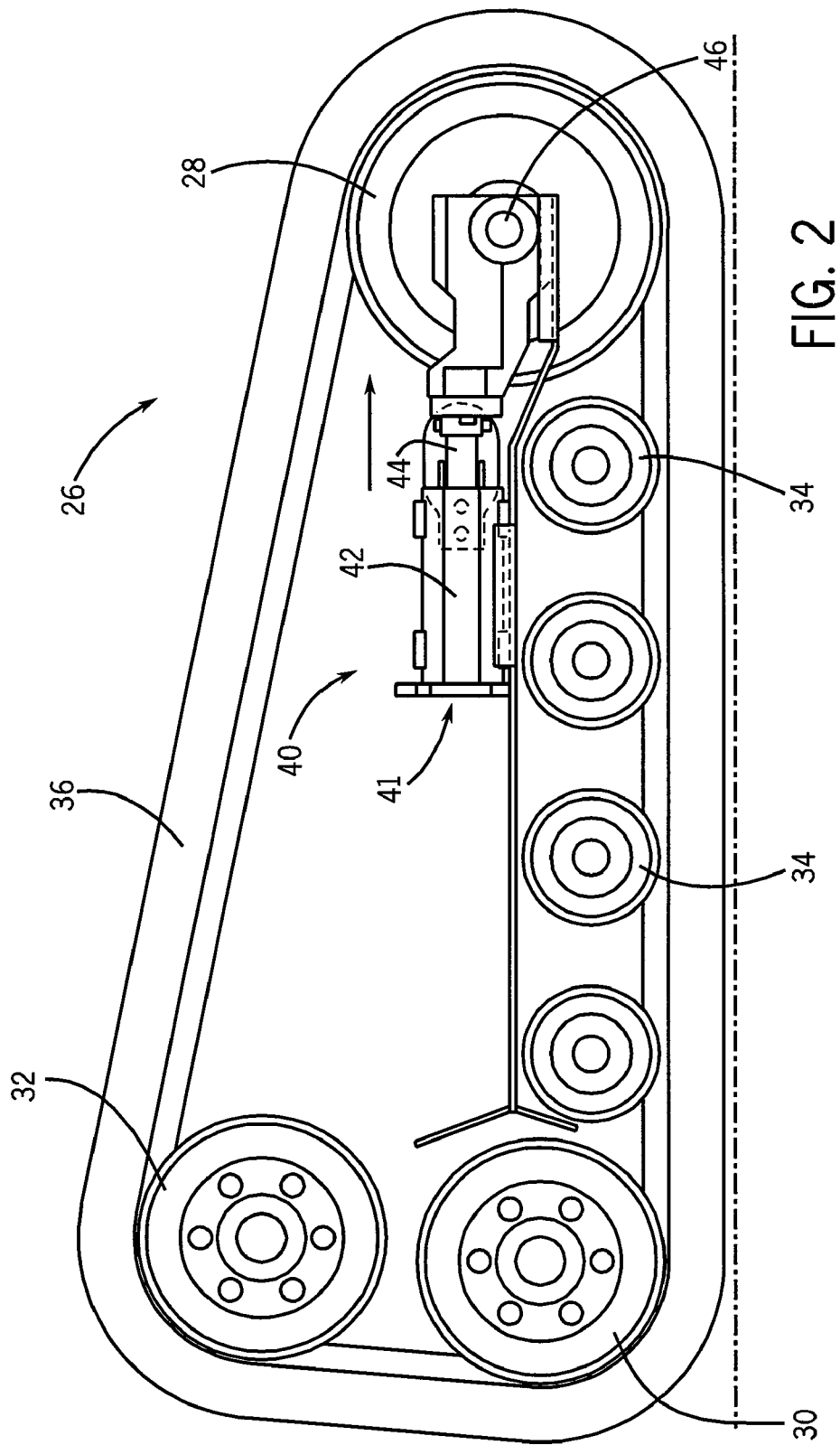
FIG. 2 is a side elevation view of an undercarriage for a track-type vehicle as in FIG. 1, showing the track tensioning device of the present invention in a position at which tension is applied to an endless track.

Referring now to FIG. 2, a track tensioning mechanism 40 in accordance with the present invention is supported by the undercarriage 26 and is operative to tension the endless track 36 around the idler rollers 28, 30 and the drive roller 32. A relatively taut engagement of the track 36 around the rollers 28, 30 and the drive roller 32 is necessary to prevent derailing of the endless track 36 and for generally consistent advancement of the vehicle 10. The track tensioning mechanism 40 is generally comprised of an actuator 41 that is preferably a dual-acting hydraulic cylinder 42 having an extendable and retractable piston 44 that is linked to the front idler roller 28.

The front idler roller 28 rotates around an axle 46 and a bracket 48 is connected between the axle 46 and the piston 44. As shown particularly in FIGS. 3 and 4, the bracket 48 includes mounting arms 50, 52 mounted adjacent opposite sides of the idler roller 28. The arms 50, 52 are interconnected by a bridge 54 that is connected to the piston 44 by a coupler 55.

The hydraulic cylinder 42 is flow-coupled to the hydraulic system (not shown) of the vehicle 10 and is operative to extend and retract the piston 44 based on a desired tensioning of the endless track 36. When the piston 44 is extended, the idler roller 28 is pushed into engagement with the endless track 36 and tightens the endless track 36 around the rollers. On the other hand, when the piston 44 is retracted, slack is introduced into the endless track 36. The present invention provides a track tensioning mechanism 40 that limits how far the piston 44 may be retracted and thus how much slack may be introduced into the endless track 36.

Figure 3:
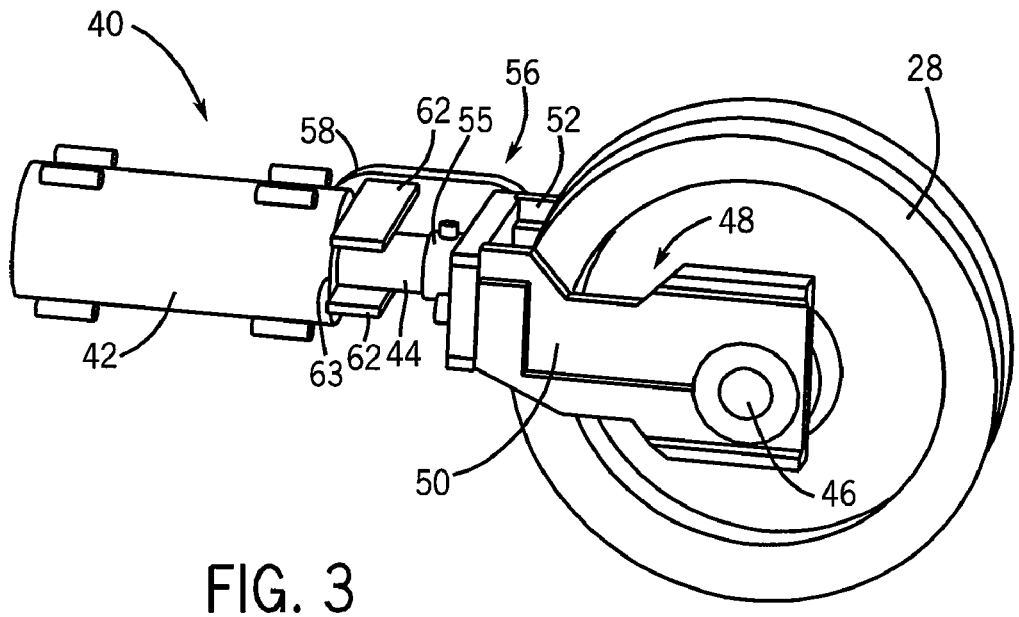
FIG. 3 is an isometric view of the track tensioning device of FIG. 2, showing the mechanical stop in an installed, operative position.
Figure 4:
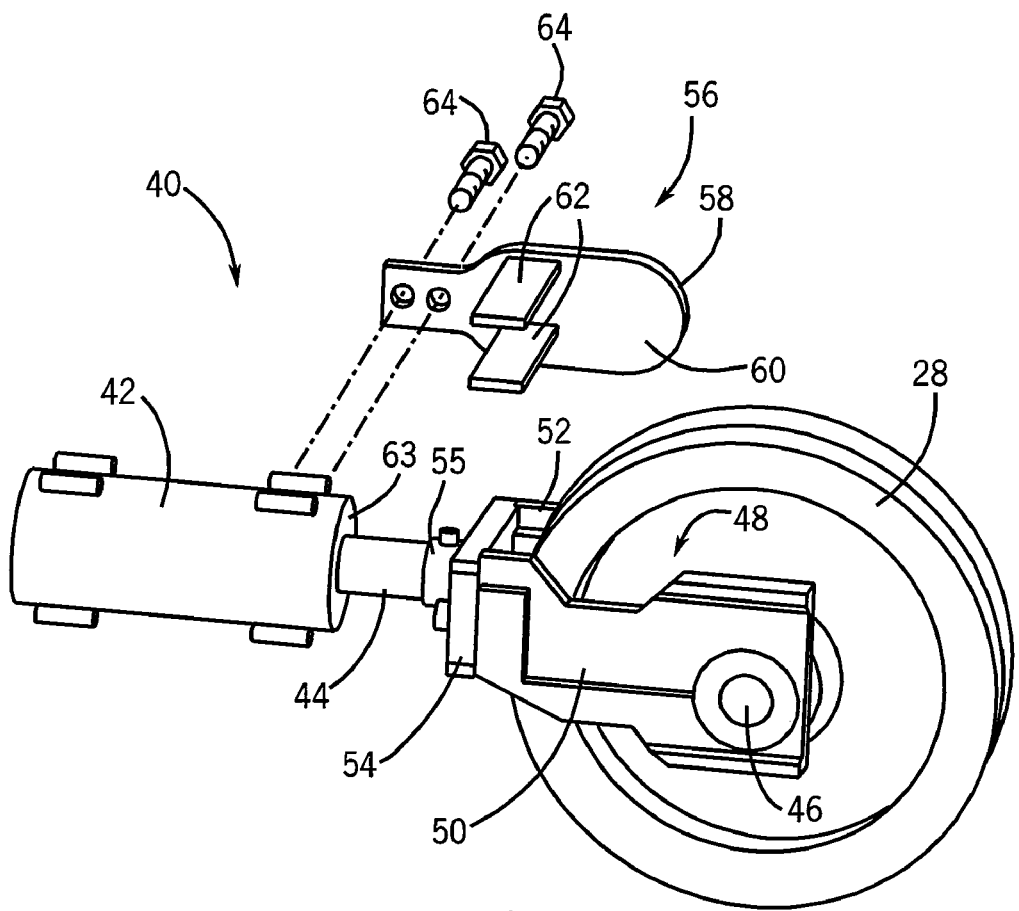
FIG. 4 is an isometric of the track tensioning device similar to that shown in FIG. 3, showing the mechanical stop in a removed, inoperative position.

A mechanical stop 56 is mounted to a side of the cylinder 42 and includes a mounting flange 58 that has a generally planar surface 60 from which spaced and parallel legs 62 axially extend. As shown in FIG. 3, the legs 62 abut against the face 63 of the cylinder 42. The flange 58 is mounted to the cylinder 42 by a pair of fasteners 64, e.g., bolts. A space (not numbered) is defined between the legs 62 and is sized to receive the piston 44 so that the piston 44 can slide longitudinally between the legs 62 when extending and retracting the idler roller 28. The mechanical stop 56 may be removed by unfastening fasteners 64, which will allow further retraction of the piston 44. As will be described more fully below, the legs 62 limit how far the piston 44 may be retracted when relieving tension in the endless track 36.

Figure 5:
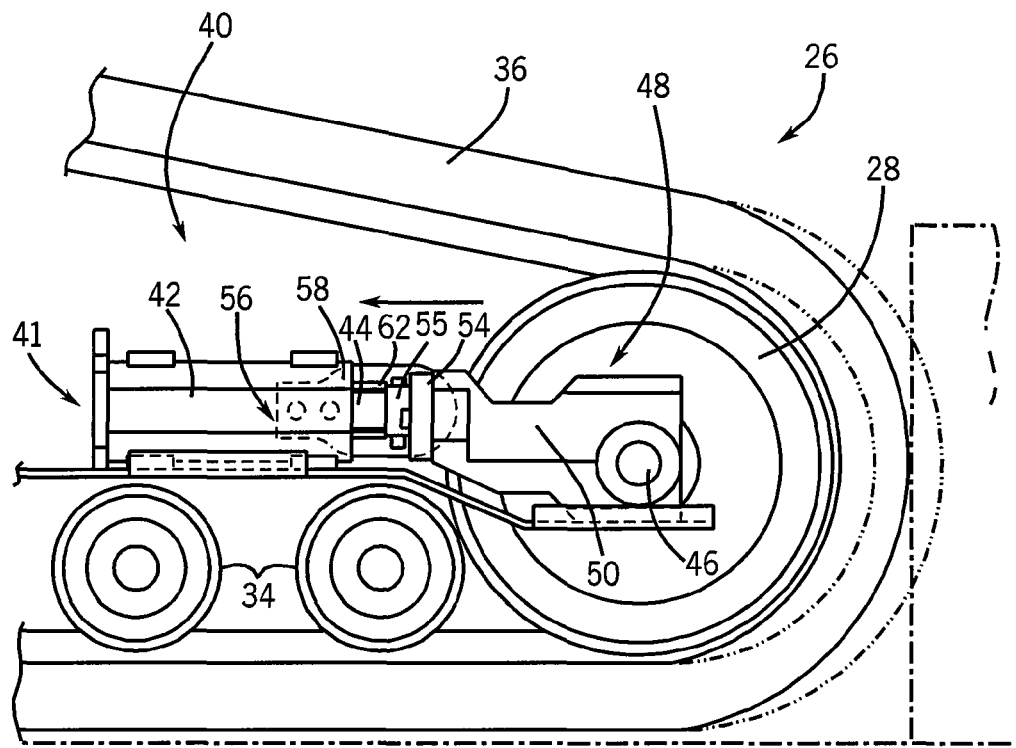
FIG. 5 is a partial side elevation view of the undercarriage shown in FIG. 2 showing the endless track tensioning device with the mechanical stop in the installed, operative position as in FIG. 3 to tension the track while allowing slight retraction of the cylinder to temporarily remove tension from the endless track.
Figure 6:
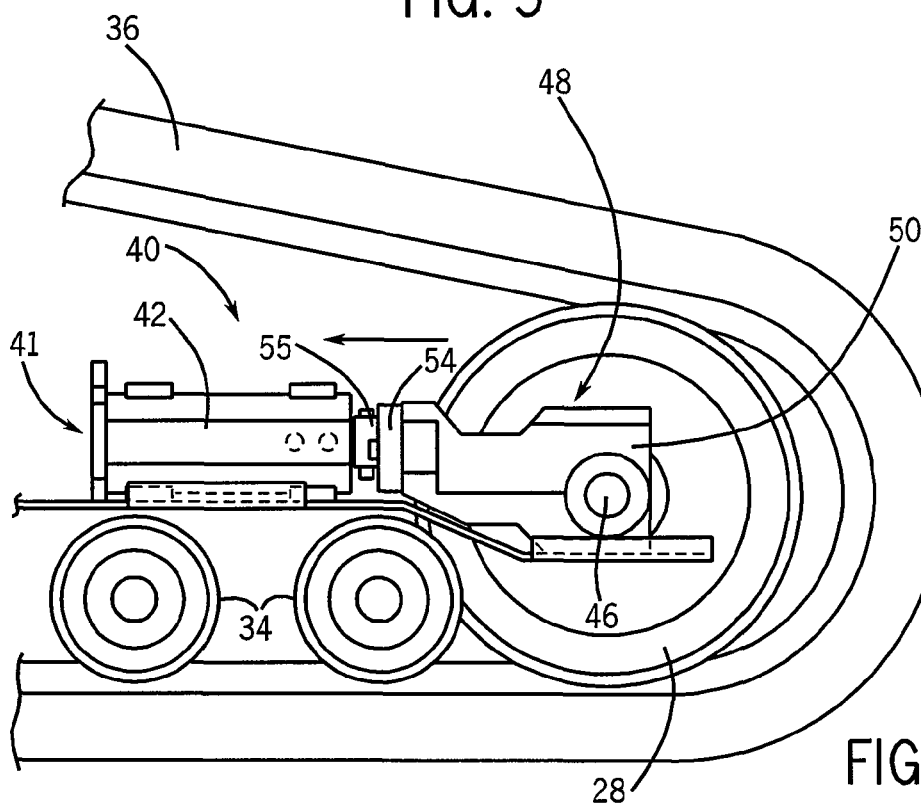
FIG. 6 is a partial side elevation view of the undercarriage shown in FIG. 2 showing the endless track tensioning device with the mechanical stop in the removed, inoperative position as in FIG. 4 to allow retraction of the cylinder to remove the endless track from the roller.

Referring now to FIGS. 2, 5 and 6, it will be appreciated that the track tensioning mechanism 40 provides three general modes of operation. In a first mode, illustrated in FIG. 2 and corresponding to normal traveling conditions for the vehicle 10, the piston 44 is extended to push the front idler roller 28 into engagement with the endless track 36. The longer the piston 44 is extended, the more tension created in the endless track 36. Thus, as the endless track 36 elongates over time, more extension of the piston 44 can be provided in order to keep the endless track 36 taut.

In a second mode, illustrated in FIG. 5, the piston 44 is retracted a limited amount to introduce slack into the endless track 36. The piston 44 may be retracted under the force of an impact, such as when the track 36 encounters an obstacle, or may be retracted by the operator to relieve tension in the track, such as for cleaning, debris removal, etc. The piston 44 may also be retracted to relieve tension in the endless track 36 when the vehicle 10 is parked. In this second mode, retraction of the piston 44 is limited by the mechanical stop 56. More particularly, the piston 44 cannot be further retracted when the bridge 54 abuts the legs 62 extending from flange 58. The mechanical stop 56 is mounted to the cylinder 42 and is configured such that the maximum amount of slack that may be introduced into the endless track 36 with the stop 56 in place is not enough to allow the endless track 36 to derail. In this mode, engagement of the endless track 36 with the rollers is sufficiently maintained to prevent removal of the endless track 36 from the undercarriage 26.

However, in a third mode illustrated in FIG. 6, the mechanical stop 56 is removed so that the piston 44 can be fully retracted to introduce sufficient slack in the endless track 36 that allows the endless track 36 to be removed from the undercarriage 26. Thus, to service, repair, or replace the endless track 36, the mechanical stop 56 is removed and the hydraulic system of the vehicle 10 is then operated to fully retract the piston 44. As shown in FIG. 6, when the piston 44 is fully retracted, the front idler roller 28 is completely disengaged from the endless track 36. In this position, the endless track 36 is sufficiently slacked to be removed from the undercarriage 26. Similarly, when installing an endless track 26, the mechanical sop 56 is preferably removed to provide full retraction of the piston 44 and thus the front idler roller 28. Once the endless track 36 is installed, the piston 44 is extended to tension the endless track 36 and the mechanical stop 54 is then re-fastened to the cylinder 42.

As noted above, the cylinder 42 is preferably a dual-acting hydraulic cylinder that is fluidly coupled with the hydraulic system of the vehicle. This allows a user to extend and retract the piston 44 using operator controls (not shown) in the operator cab 12. Additionally, the cylinder 42 is allowed to retract slightly to the position shown in FIG. 5 when the endless track 36 experiences an impact or encounters an obstacle. The hydraulic pressure in the cylinder 42 causes automatic extension of the piston 44 to maintain a relative uniform tension in the endless track 36 during normal operation. The mechanical stop 54 prevents the piston 44 from retracting excessively during such conditions, which maintains the track 36 on the rollers and also isolates the hydraulic system from excessive sudden increases in pressure that could otherwise occur.

The removable mechanical stop 54 is shown and described as being fully removable from the piston 44. It should be appreciated, however, that the stop may also be configured such it is movably mounted to the vehicle 10 and does not have to be completely removed in order to allow the piston to fully retract. For example, the stop 54 may be interconnected with the vehicle using a pivoting or sliding connection, which allows the stop 54 to be selectively moved between the operative and inoperative positions. In this alternate connection, the mechanical stop 54 does not need to be fully removed from the undercarriage 26 to slack the endless track 36 sufficiently for track removal. It will be appreciated that a tensioning mechanism such as that described herein may be used to move the rear idler roller instead of, or in addition to, the front idler roller.

Various alternatives and embodiments are contemplated as being within the scope of the following claims, which particularly point out and distinctly claim the subject matter regarded as the invention.

We claim:

1. A track tensioning system for use with a tracked vehicle having an endless track entrained about a series of rollers, comprising:
   a dual-acting fluid operated cylinder having a piston operative to force one of the rollers into engagement with the endless track when the piston is in an extended position and operative to remove tension placed on the endless track by the roller when the piston is retracted from the extended position, wherein the dual-acting cylinder is adapted to automatically retract the piston when the endless track encounters an obstruction; and
   a mechanical stop associated with the piston and operative to limit retraction of the piston when the endless track encounters an obstruction.

2. The track tensioning system of claim 1, wherein the roller includes an axle, and further comprising an axle mount connected to the axle and the piston, and wherein the mechanical stop is coupled to the dual-acting cylinder and has at least one stop member that limits the retractable distance of the piston toward the cylinder.

3. The track tensioning system of claim 2, wherein the mechanical stop includes a stop mount fastened to the cylinder and wherein the at least one stop member extends axially from the stop mount.

4. The track tensioning system of claim 3, wherein the at least one stop member includes a second stop member extending axially from the stop mount spaced from and parallel to the first-mentioned stop member.

5. The track tensioning system of claim 2, wherein the axle mount includes a first axle mount arm and a second axle mount arm, each of which is connected to the axle at opposite adjacent sides of the front roller, and a bridge member connecting the first and the second axle mount arms, and wherein the piston is coupled to the bridge member.

6. The track tensioning system of claim 1, wherein the dual-acting cylinder is a hydraulic cylinder that is interconnected with a hydraulic system on the vehicle.

7. The track tensioning system of claim 1, wherein the mechanical stop is removable to allow further retraction of the piston to further remove tension in the endless track for removal of the endless track from engagement with the roller.

8. The track tensioning system of claim 1, wherein the dual-acting cylinder is operative to automatically extend the piston to retension the endless track when the obstruction has been cleared.

9. The track tensioning system of claim 1, wherein the tracked vehicle is a compact track loader.

10. A carriage assembly for a tracked vehicle, comprising:
    a first roller and a second roller;
    an endless track entrained around the first roller and the second roller; and
    a tensioning apparatus operative to force the first roller into engagement with the endless track to tension the endless track and operative to pull the first roller away from engagement with the endless track to reduce tension in the endless track when the endless track encounters an obstruction, wherein the tensioning apparatus comprises:
    a dual-acting hydraulic cylinder having an extendable and retractable piston linked to the first roller to add or remove tension in the endless track by extending or retracting the piston; and
    a removable stop that limits a retraction length of the piston so that an amount of slack introduced in the endless track when the piston is retracted is limited and wherein when the removable stop is removed, additional slack may be introduced for removal of the endless track.

11. The assembly of claim 10, wherein the first roller includes an axle, and further comprising an axle mount connected to the axle and the piston, and wherein the removable stop is coupled to the dual-acting hydraulic cylinder and has at least one stop member that limits the retractable distance of the piston toward the dual-acting hydraulic cylinder.

12. The assembly of claim 11, wherein the removable stop includes a stop mount fastened to the dual-acting hydraulic cylinder and wherein the at least one stop member extends axially from the stop mount.

13. The assembly of claim 12, wherein the at least one stop member includes a second stop member extending axially from the stop mount spaced from and parallel to the at least one stop member.

14. The assembly of claim 11, wherein the axle mount includes a first axle mount arm and a second axle mount arm, each of which is connected to the axle at opposite adjacent sides of the first roller, and a bridge member connecting the first and the second axle mount arms, and wherein the piston is coupled to the bridge member.

15. The assembly of claim 10, wherein the dual-acting hydraulic cylinder is operative to automatically extend the piston to re-tension the endless track when the obstruction has been cleared, and wherein the first roller is a front roller and the second roller is a rear roller.

16. A vehicle comprising:
    an operator cab;
    a chassis supporting the operator cab;
    a carriage assembly carried by the chassis and including a front roller and a rear roller,
    an endless track entrained around the front roller and the rear roller, and a tensioning apparatus operative to force the front roller into engagement with the endless track to tension the endless track and pull the front roller away from engagement with the endless track to reduce tension in the endless track, wherein the tensioning apparatus comprises:

a dual-acting hydraulic cylinder having an extendable and retractable piston linked to the front roller to add or remove tension in the endless track by extending or retracting the piston, respectively; and a removable stop that limits a retraction length of the piston so that an amount of slack introduced in the endless track when the piston is retracted is limited and wherein when the removable stop is removed, additional slack may be introduced for removal of the endless track.

17. The vehicle of claim 16, wherein the front roller includes an axle, and further comprising an axle mount connected to the axle and the piston, and wherein the removable stop is coupled to the dual-acting cylinder and has at least one stop member that limits the retractable distance of the piston toward the cylinder.

18. The vehicle of claim 17, wherein the removable stop includes a stop mount fastened to the cylinder and wherein the at least one stop member extends axially from the stop mount.

19. The vehicle of claim 18, wherein the at least one stop member includes a second stop member extending axially from the stop mount spaced from and parallel to the at least one stop member.

20. The vehicle of claim 17, wherein the axle mount includes a first axle mount arm and a second axle mount arm, each of which is connected to the axle at opposite adjacent sides of the front roller, and a bridge member connecting the first and the second axle mount arms, and wherein the piston is coupled to the bridge member.

* * * * *